United States Patent
DeRose et al.

(10) Patent No.: US 9,906,311 B1
(45) Date of Patent: Feb. 27, 2018

(54) TRANSCEIVERS AND RECEIVERS FOR QUANTUM KEY DISTRIBUTION AND METHODS PERTAINING THERETO

(71) Applicant: National Technology & Engineering Solutions of Sandia, LLC, Albuquerque, NM (US)

(72) Inventors: Christopher DeRose, Albuquerque, NM (US); Mohan Sarovar, Albany, CA (US); Daniel B. S. Soh, Pleasanton, CA (US); Anthony Lentine, Albuquerque, NM (US); Paul Davids, Albuquerque, NM (US); Ryan Camacho, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/078,883

(22) Filed: Mar. 23, 2016

Related U.S. Application Data

(66) Substitute for application No. 62/153,277, filed on Apr. 27, 2015.

(51) Int. Cl.
*H04B 10/00* (2013.01)
*H04B 10/70* (2013.01)
*H04J 14/02* (2006.01)
*H04B 10/60* (2013.01)

(52) U.S. Cl.
CPC ............. *H04B 10/70* (2013.01); *H04B 10/60* (2013.01); *H04J 14/02* (2013.01)

(58) Field of Classification Search
CPC ...... H04B 10/70; H04B 10/60; H04B 10/613; H04B 10/63; H04B 10/61; H04B 10/614; H04B 10/506; H04B 10/6151; H04B 10/0795; H04B 10/07955; H04B 10/40; H04B 10/50; H04B 10/67; G02B 2006/12147; G02B 6/12007; H04J 14/02; G01B 2290/45; G01B 9/02079; H01S 5/0265
USPC ... 398/202–205, 207, 208, 210, 211, 79, 25, 398/34, 140, 152, 187, 188, 184
See application file for complete search history.

(56) References Cited

U.S. PATENT DOCUMENTS

| | | |
|---|---|---|
| 5,319,438 A * | 6/1994 | Kiasaleh ............... H04B 10/61 250/227.27 |
| 5,850,441 A | 12/1998 | Townsend et al. |
| 7,403,623 B2 | 7/2008 | Cerf et al. |
| 7,929,700 B2 | 4/2011 | Lodewyck et al. |
| 7,936,883 B2 | 5/2011 | Imai et al. |

(Continued)

*Primary Examiner* — Hibret Woldekidan
(74) *Attorney, Agent, or Firm* — Medley, Behrens & Lewis, LLC

(57) ABSTRACT

Various technologies for performing continuous-variable (CV) and discrete-variable (DV) quantum key distribution (QKD) with integrated electro-optical circuits are described herein. An integrated DV-QKD system uses Mach-Zehnder modulators to modulate a polarization of photons at a transmitter and select a photon polarization measurement basis at a receiver. An integrated CV-QKD system uses wavelength division multiplexing to send and receive amplitude-modulated and phase-modulated optical signals with a local oscillator signal while maintaining phase coherence between the modulated signals and the local oscillator signal.

16 Claims, 7 Drawing Sheets

(56) References Cited

U.S. PATENT DOCUMENTS

| | | | |
|---|---|---|---|
| 8,165,298 B2 | 4/2012 | Kawamoto et al. | |
| 8,477,939 B2 | 7/2013 | Youn et al. | |
| 8,654,980 B2 | 2/2014 | Harrison et al. | |
| 8,683,192 B2 | 3/2014 | Ayling et al. | |
| 9,148,225 B2 | 9/2015 | Lowans et al. | |
| 9,625,351 B2 * | 4/2017 | Ataie | G01M 11/338 |
| 2004/0151423 A1 * | 8/2004 | Izhaky | G02B 6/1228 385/21 |
| 2004/0208644 A1 * | 10/2004 | Sirat | H04B 10/2575 398/186 |
| 2008/0013738 A1 * | 1/2008 | Tajima | H04L 9/0852 380/278 |
| 2009/0046857 A1 * | 2/2009 | Nambu | H04L 9/0852 380/255 |
| 2009/0116851 A1 * | 5/2009 | Heffner | H04B 10/677 398/208 |
| 2010/0158522 A1 * | 6/2010 | Cho | H04B 10/506 398/65 |
| 2013/0236195 A1 * | 9/2013 | Ryf | H04B 10/615 398/208 |
| 2014/0099108 A1 * | 4/2014 | Yu | H04B 10/614 398/48 |
| 2014/0253915 A1 * | 9/2014 | Ataie | G01M 11/338 356/300 |
| 2015/0029575 A1 * | 1/2015 | Hara | G01J 3/10 359/279 |
| 2016/0238795 A1 * | 8/2016 | Tan | G02B 6/3546 |

\* cited by examiner

TRANSCEIVERS AND RECEIVERS FOR QUANTUM KEY DISTRIBUTION AND METHODS PERTAINING THERETO

RELATED APPLICATION

This application claims priority to U.S. Provisional Patent Application No. 62/153,277, filed on Apr. 27, 2015, and entitled "TRANSCEIVERS AND RECEIVERS FOR QUANTUM KEY DISTRIBUTION AND METHODS PERTAINING THERETO", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Quantum key distribution (QKD) refers to communication methods that use quantum mechanical principles to guarantee secure communication between two parties. In QKD, a (random) secret key is shared between the two parties, where the key is known only by the two parties to the communication. The key is used to encrypt and decrypt messages. Security of communication between the two parties is assured as a result of the quantum uncertainty principle. If an eavesdropper on a communications channel measures data being transmitted, anomalies are introduced in the data that are then passed down the communications channel and received by a receiver that is party to the secure communication. The receiver can detect the eavesdropper by observing the presence of these anomalies, and can either cease the communication or discard compromised bit values of the shared key.

Discrete variable QKD (DV-QKD) systems modulate and analyze properties of single photons in optical signals to encode and decode data for QKD. DV-QKD systems can encode data on polarization states of single photons, where a polarization state of a photon can represent a logic "1" or a logic "0". A DV-QKD protocol, BB84, defines a method for performing DV-QKD in which two measurement basis sets are used by a transmitter to transmit information, wherein each basis set defines two different photon polarization states corresponding to the two logic states, for a total of four possible polarization values. A receiver, not knowing which basis set a photon was transmitted in, measures the polarization state of the photon in a randomly-chosen basis. The transmitter and the receiver then compare chosen bases for each measurement to securely determine which of a plurality of communicated bits will make up a shared encryption key.

Continuous variable QKD (CV-QKD) systems modulate and analyze phase and amplitude of continuous low-intensity optical signals in order to encode and decode data for QKD. CV-QKD systems, like DV-QKD systems, typically use communications protocols that call for sending data on two different measurement bases and comparing the measurement bases used during reception in order to securely exchange a shared encryption key. Conventional CV-QKD systems require a local oscillator signal to be separated from a data signal at a transmitter prior to modulating the data signal to encode some data. The local oscillator and the data signal are then recombined and transmitted on a communications channel to provide a way for a transmitter and a receiver to measure signal features from a common reference. QKD systems have conventionally relied on bulk fiber-optic components such as Faraday mirrors and long fiber-optic delay lines in order to maintain phase coherence between the local oscillator and the data signal.

SUMMARY

The following is a brief summary of subject matter that is described in greater detail herein. This summary is not intended to be limiting as to the scope of the claims.

Various technologies to facilitate performing QKD are disclosed herein. In an example, a DV-QKD system is implemented with a first integrated electro-optical circuit functioning as a transmitter and a second integrated electro-optical circuit functioning as a receiver. In the example, the transmitter transmits data on an optical signal by modulating a polarization of photons of the signal using a Mach-Zehnder modulator that also chooses a polarization measurement basis. The receiver uses a Mach-Zehnder modulator to choose a measurement basis on which a photodetector measures the polarization.

In another example, a CV-QKD system is implemented with a first integrated electro-optical circuit functioning as a transmitter and a second integrated electro-optical circuit functioning as a receiver. In the example, the transmitter encodes data on a continuous optical data signal using phase and amplitude modulation. The transmitter maintains phase coherence between a local oscillator signal of the transmitter and the data signal on the transmission channel by frequency shifting one of the local oscillator signal and the data signal, and performing wavelength division multiplexing (WDM) of the signals prior to transmission. The receiver then uses WDM to demultiplex the signals, whereupon heterodyne detection is performed between the local oscillator and the data signal to measure an amplitude and a phase of the data signal.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
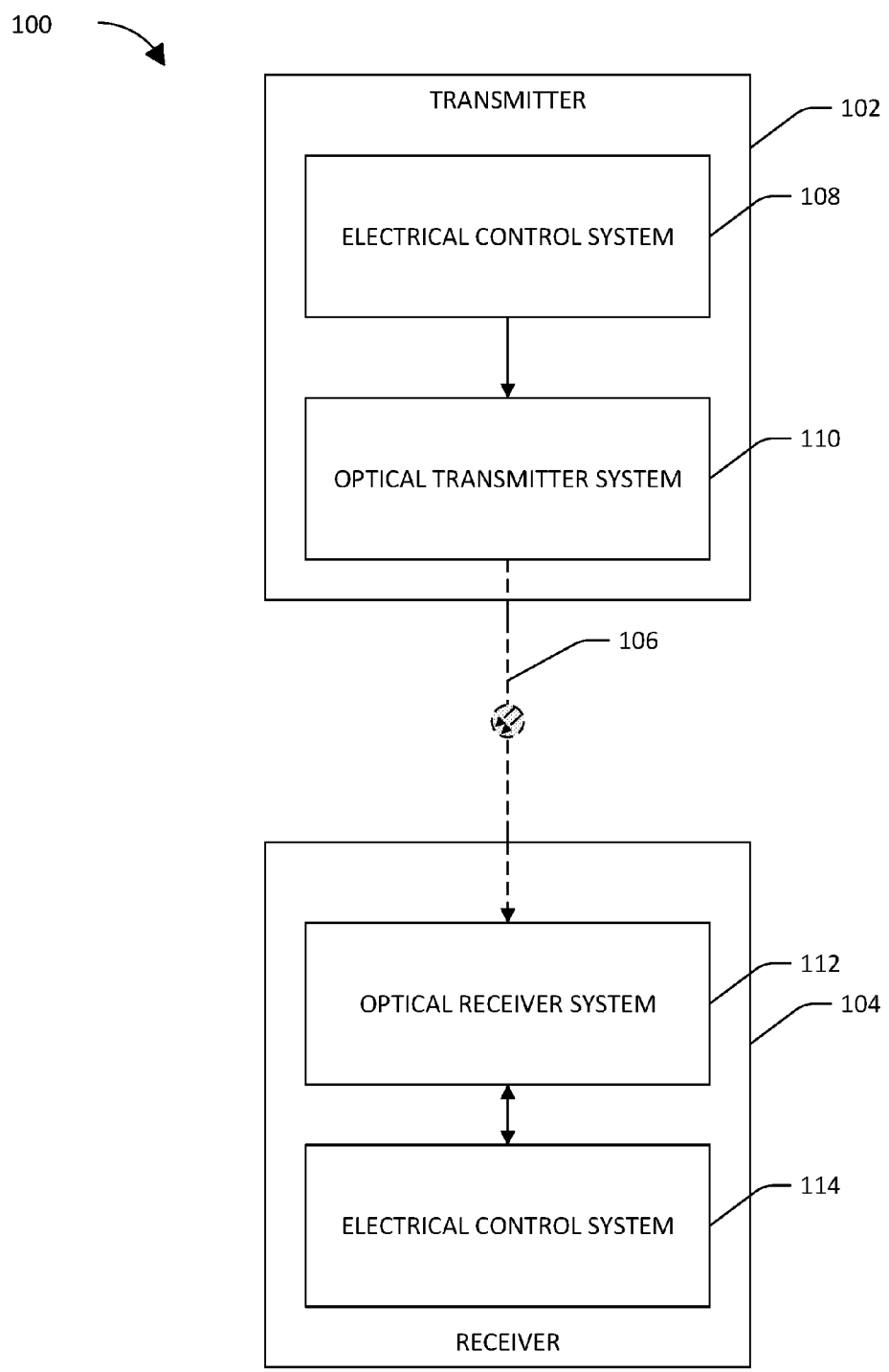
FIG. 1 is a functional block diagram of an exemplary system that facilitates QKD.

Various technologies pertaining to CV-QKD and DV-QKD are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates QKD with integrated electro-optical circuits is illustrated, wherein an integrated electro-optical circuit is a device comprising electrical components and optical components implemented on a same semiconductor substrate. The system 100 includes a transmitter 102, a receiver 104, and an optical communications path 106 by which the transmitter 102 and the receiver 104 engage in optical communication. The transmitter 102 and the receiver 104 are each integrated electro-optical circuits with electrical and optical components on a same substrate. In an example, the transmitter 102 is a single integrated electro-optical circuit comprising an electrical control system 108 and an optical transmitter system 110, wherein the electrical control system controls a transmission output of the optical transmitter system 110. For instance, the electrical control system 108 is an FPGA, an ASIC, a real time processor, etc. that is configured to control optical phase and amplitude modulators, wavelength division multiplexers (WDM), Mach-Zehnder modulators, etc. In another example, the receiver 104 is an integrated electro-optical circuit comprising an optical receiver system 112 that receives optical signals from the optical communications path 106. The receiver 104 also comprises an electrical control system 114 that configures and controls the operation of the optical receiver system 112 and receives data from the optical receiver system 112. The exemplary system 100 may be configured to perform either CV-QKD or DV-QKD, depending on the configuration of the optical transmitter system 110 and the optical receiver system 112. The CV-QKD and DV-QKD configurations of these systems 110 and 112 are described in greater detail below with respect to FIGS. 2-4.

Figure 2:
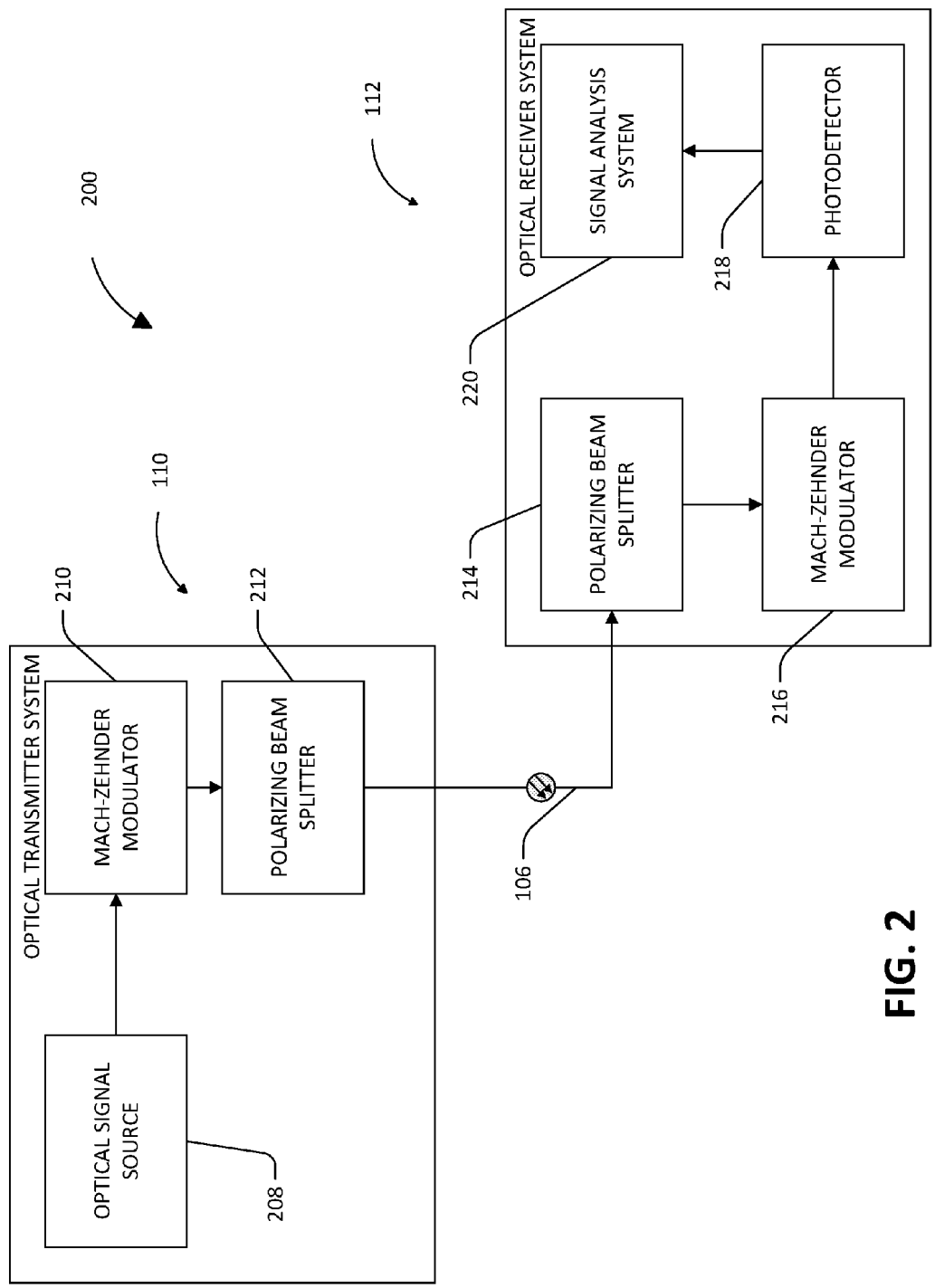
FIG. 2 is a functional block diagram of an exemplary system that facilitates DV-QKD.

Referring now to FIG. 2, an exemplary system 200 that facilitates polarization-modulation DV-QKD is illustrated. The system 200 includes the optical transmitter system 110, the optical receiver system 112, and the optical communications path 106 connecting the optical transmitter system 110 and the optical receiver system 112. The optical transmitter system 110 and the optical receiver system 112 are respective integrated electro-optical circuits, wherein the components of each circuit are on respective same semiconductor chips. In an example, the optical transmitter system 110 is an integrated electro-optical circuit The optical transmitter system 110 comprises an optical signal source 208 that generates an optical signal. For instance, the optical signal source 208 can be or include a laser, a light emitting diode (LED), or other suitable light source. The optical transmitter system 110 further comprises a Mach-Zehnder modulator 210 and a polarizing beam splitter 212. The Mach-Zehnder modulator 210 receives the optical signal, creates two optical output signals, and modulates an amplitude of each of the two output signals and a relative phase between the signals. The polarizing beam splitter 212 receives the two output signals and combines them in orthogonal polarizations to create a single optical output signal with an output polarization that is dependent on the amplitude of each of the two output signals of the Mach-Zehnder modulator 210 and the relative phase between those two signals. The polarizing beam splitter 212 outputs the single optical output signal to the communications path 106 whereupon the optical transmitter system 110 transmits the single optical signal to the optical receiver system 112.

The optical receiver system 112 comprises a polarizing beam splitter 214 that receives the optical signal from the communications path 106 and splits the signal into two separate signals. The optical receiver system 112 also includes a two-input Mach-Zehnder modulator 216 that is in optical communication with the polarizing beam splitter 214. The Mach-Zehnder modulator 216 receives the two separate signals and introduces a phase shift between them in order to select a measurement basis, wherein the measurement basis is selected based upon an electrical control input from the electrical control system 114. Accordingly, the Mach-Zehnder modulator 216 outputs two optical signals, where the Mach-Zehnder modulator 216 has shifted the phase of at least one of the two optical signals. The optical receiver system 112 further includes a photodetector 218 that is in optical communication with the Mach-Zehnder modulator 216. The photodetector 218 receives the two signals output by the Mach-Zehnder modulator 216, and is configured to generate electrical signals that are indicative of amplitudes of the optical signals output by the Mach-Zehnder modulator 216. The optical receiver system 112 further comprises a signal analysis system 220 that is in communication with the photodetector 218. The signal analysis system 220 receives the measurements generated by the photodetector 218 and determines whether the optical signal received by the polarizing beam splitter 214 corresponds to a logic "1" or logic "0" in the measurement basis chosen by the Mach-Zehnder modulator 216.

Details of the operation of the system 200 are now set forth. At the optical transmitter system 110, the optical signal source 208 generates a low-intensity optical signal. In an example, the optical signal source 208 is an attenuated laser capable of emitting single photons. The Mach-Zehnder modulator 210 receives the low-intensity signal from the optical signal source 208 and generates two optical output signals. The Mach-Zehnder modulator 210 modulates the two output signals on phase and amplitude, whereupon the output signals are received by the polarizing beam splitter 212. The polarization of the single optical signal output by the polarizing beam splitter 212 depends on the amplitude and the phase of the output signals from the Mach-Zehnder modulator 210. Thus, the Mach-Zehnder modulator 210 can encode data on a polarization of the output of the polarizing beam splitter 212 by controlling the two output signals that are received by the polarizing beam splitter 212. In an example, the polarity state of an optical signal can be described by a polarization angle that refers to an angle between a horizontal reference and a polarization vector of the electric field of the photon. In an example in which the system 200 is used to implement the BB84 DV-QKD protocol, the polarization angle can be 0° or 90° corresponding to logic "1" and logic "0", respectively, in a first measurement basis, and can be 45° or 135° corresponding to the two logic states in a second measurement basis. In the exemplary implementation, the Mach-Zehnder modulator 210, responsive to receiving an electrical control input from the electrical control system 108 controls the polarization of a photon in the low-intensity optical signal by modulating amplitude and phase of the optical signals received by the polarizing beam splitter 212 in order to encode a logic value in one of the two measurement bases. The polarizing beam splitter 212 transmits the single optical output signal on the optical communications path, the signal polarization being controlled by the modulation of the two output signals of the Mach-Zehnder modulator 210. In an example, the optical communications path 106 is a fiber-optic communications line.

The optical receiver system 112 receives the combined signal from the communications path 106 at the polarizing beam splitter 214. The polarizing beam splitter 214 splits the combined signal and the Mach-Zehnder modulator 216 receives two resulting signal components each having a same transverse electric polarization. In another example, the two resulting signal components can have a same transverse magnetic polarization. As described below in greater detail with respect to FIG. 3, the Mach-Zehnder modulator 216 selects a measurement basis in which the optical receiver system 112 measures the signal components by imparting a relative phase between the two signal components. In an example, the Mach-Zehnder modulator 216 can be controlled by the electrical control system 114 of the receiver 104 to select the relative phase. By imposing a relative phase difference of 0° between the signal components, the Mach-Zehnder modulator 216 selects the first measurement basis, in which logic 0 is represented by a photon polarization of 0° and a logic 1 is represented by a photon polarization of 90°. By imposing a relative phase difference of 90° between the signal components, the Mach-Zehnder modulator 216 selects the second measurement basis, in which logic 0 is represented by a photon polarization of 45° and a logic 1 is represented by a photon polarization of 135°. The Mach-Zehnder modulator 216 has two optical signal outputs, each of the optical signal outputs corresponding to a polarization of the chosen measurement basis.

The photodetector 218 receives the two optical outputs of the Mach-Zehnder modulator and outputs an electrical signal comprising a measurement of an amplitude of at least one of the optical outputs. In an example, the photodetector comprises two photodiode circuits, each photodiode receiving one of the optical outputs of the Mach-Zehnder modulator 216. The Mach-Zehnder modulator 216 is configured such that one of the optical outputs to the photodetector 218 is at a maximum value at a logic state of the chosen measurement basis. In an example, in the first measurement basis one of the modulator outputs is at a maximum when the polarizing beam splitter 214 receives an optical signal with a polarization angle of 0° and the other modulator output is at a maximum when the polarizing beam splitter 214 receives an optical signal with a polarization angle of 90°. In another example, in the second measurement basis one of the modulator outputs is at its maximum at a polarization angle of 45° and the other modulator output is at its maximum at a polarization angle of 135°. The signal analysis system 220 receives the electrical signal comprising the measurement of the at least one optical output and determines a polarization value of the optical signal received by the optical receiver system 112 based upon the amplitude of the electrical signal. In an example, the signal analysis system 220 can comprise an FPGA, an ASIC, a real-time processor, etc., configured to perform the acts described. In another example, the signal analysis system 220 can be a component of the electrical control system 114. In the example, the electrical control system 114 can further comprise a data storage component that can store measurement basis data and polarization values, and the signal analysis system 220 can be configured to match polarization values with a measurement basis with which the Mach-Zehnder modulator 216 received the optical signal.

Figure 3:
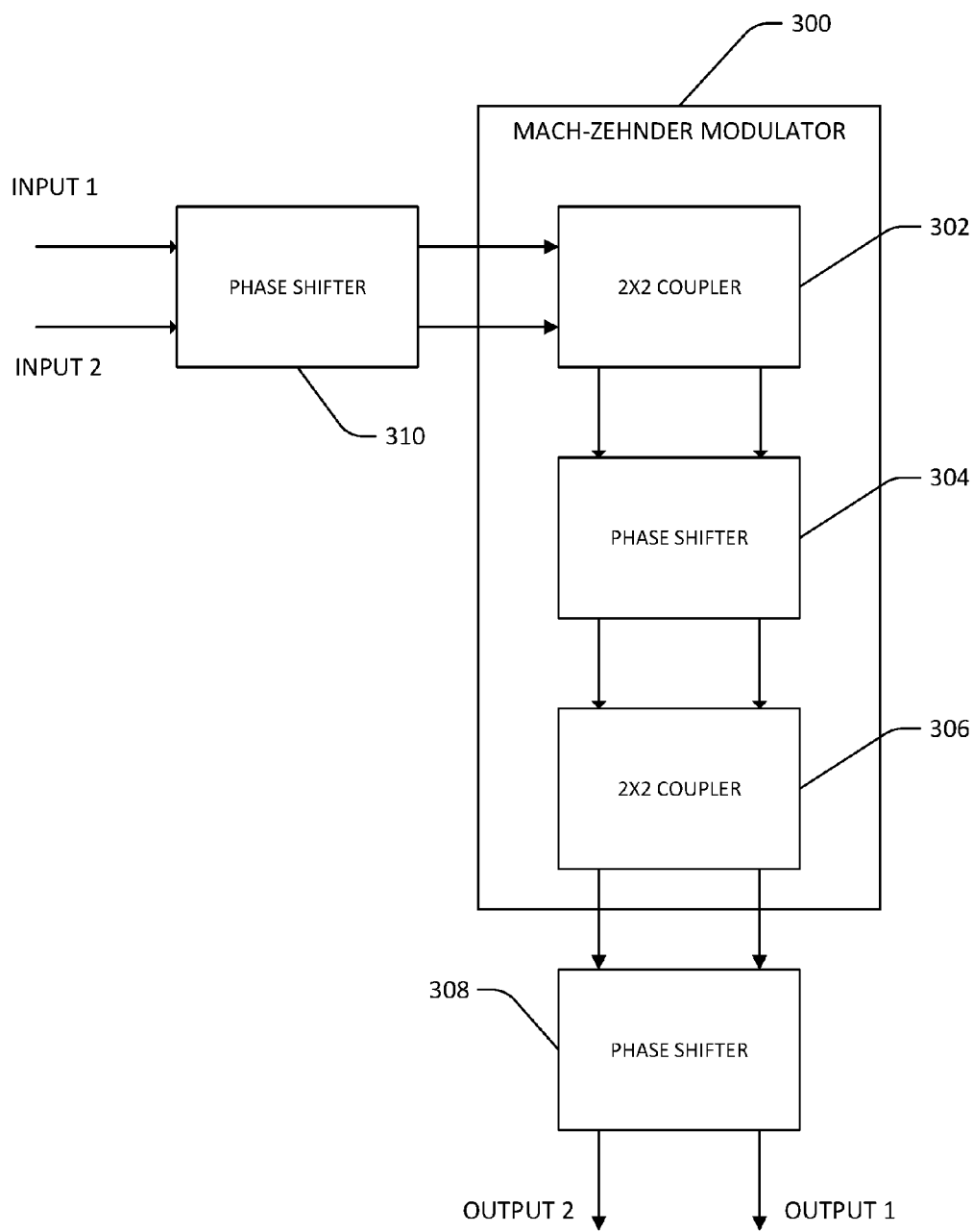
FIG. 3 is a functional block diagram of an exemplary Mach-Zehnder modulator that facilitates DV-QKD.

Referring now to FIG. 3, an exemplary Mach-Zehnder modulator 300 is illustrated. The exemplary Mach-Zehnder modulator 300 comprises a two-input two-output (2×2) optical coupler 302 configured to receive two optical signals, input 1 and input 2. The modulator 300 further comprises a phase shifter 304 that receives optical signals output from the 2×2 optical coupler 302 and phase shifts one or both of the optical signals to result in a relative phase difference between two outputs of the phase shifter 304. As described above, the relative phase difference of the Mach-Zehnder modulator 210 of the optical transmitter system 110 can be used to control a polarization of photons transmitted over an optical transmission medium. The Mach-Zehnder modulator 216 of the optical receiver system 112 can select the relative phase difference to select a measurement basis in which the photodetector 218 measures the polarization of photons received. The Mach-Zehnder modulator 300 also comprises a 2×2 coupler 306 configured to receive the two outputs of the phase shifter 304 and to output two optical signals, output 1 and output 2. In an example, the 2×2 couplers 302 and 306 are 90° couplers. In another example, the 2×2 couplers 302 and 306 are adiabatic couplers. In the example where the couplers 302 and 306 are adiabatic couplers, an additional phase shift between either input 1 and input 2 (for a receiver) or output 1 and output 2 (for a transmitter) is required to enable the Mach-Zehnder modulator 300 to choose a measurement basis for photons in the input and output signals. When the Mach-Zehnder modulator 300 functions as part of the optical transmitter system 110, a phase shifter 308 imparts an additional 90° phase shift between output 1 and output 2. Similarly, when the Mach-Zehnder modulator 300 functions as part of the optical receiver system 112, a phase shifter 310 imparts a 90° phase shift between input 1 and input 2.

Figure 4:
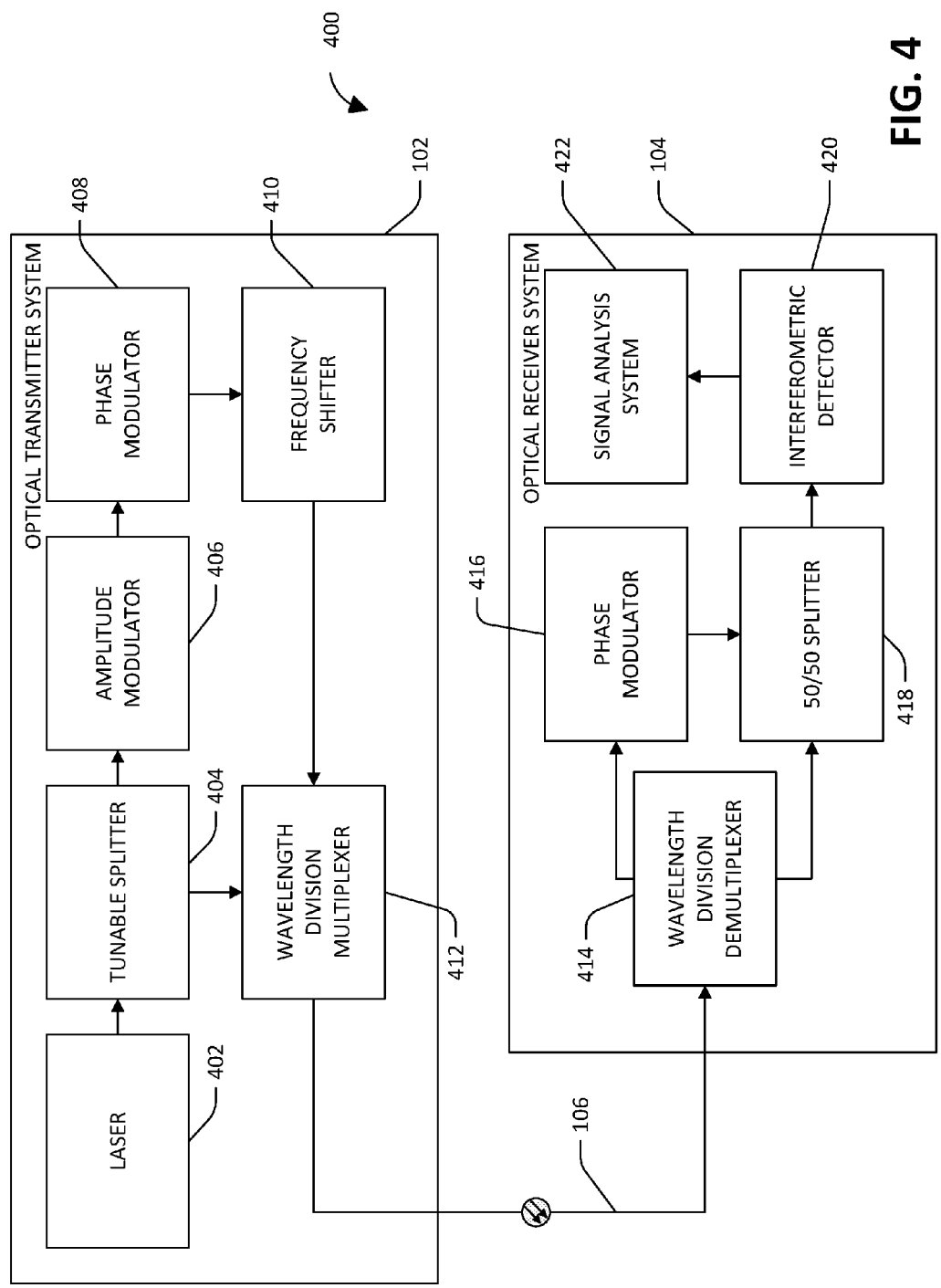
FIG. 4 is a functional block diagram of an exemplary system that facilitates CV-QKD.

Referring now to FIG. 4, an exemplary optical communication system 400 is shown that facilitates CV-QKD. The illustrated system 400 comprises the optical transmitter system 110, the optical receiver system 112, and the optical communications path 106, configured to perform CV-QKD.

In the illustrated CV-QKD configuration, the optical transmitter system 110 comprises a laser 402 that generates a coherent beam of light. The optical transmitter system 110 further comprises a tunable splitter 404 that receives the beam and splits the light into a high-power local oscillator signal and a low-power signal. The optical transmitter system 110 also includes an amplitude modulator 406 and a phase modulator 408 that receive the low-power signal and modulate an amplitude and a phase of the signal, respectively, to generate a modulated data signal. The optical transmitter system 110 further comprises a frequency shifter 410 that shifts a frequency of an input signal to alter its wavelength. In the exemplary optical transmitter system 110 pictured, the frequency shifter 410 receives the modulated data signal and shifts a frequency of the modulated data signal. In an alternate example, the frequency shifter 410 receives the local oscillator signal and shifts a frequency of the oscillator signal. The optical transmitter system 110 also comprises a wavelength division multiplexer 412 that receives the local oscillator signal and the modulated data signal, one of which has been frequency-shifted by the frequency shifter 410. The wavelength division multiplexer 412 performs wavelength division multiplexing on the local oscillator signal and the modulated data signal to output the signals together as a combined signal on a same output channel. The optical transmitter system 110 then transmits the combined signal to the optical receiver system 112 over the optical communications path 106.

The exemplary optical receiver system 112 is an integrated electro-optical circuit that is configured to perform CV-QKD. In the CV-QKD configuration, the optical receiver system 112 comprises a wavelength division demultiplexer 414 that receives the combined signal from the optical communications path 106, and outputs the modulated data signal and the local oscillator signal separately. In an example, the system 112 further comprises a phase modulator 416 that receives one of the modulated data signal and the local oscillator signal. The phase modulator 416 shifts a phase of the received signal, causing a relative phase difference between the modulated data signal and the local oscillator signal. The electrical control system 114 outputs an electrical signal that is configured to control operation of the phase modulator 416. The phase modulator 416, in response to receipt of the signal, selects the relative phase difference based upon the electrical signal received from the electrical control system 114. By controlling the relative phase difference imposed by the phase modulator 416, the electrical control system 114 can select a quadrature of the modulated data signal that the optical receiver system 112 will analyze. The system 112 also comprises a 50/50 splitter 418 that receives the modulated data signal and the local oscillator signal, one of which is phase-shifted, and combines the signals. The system 112 further includes an interferometric detector 420 that receives the combined signals from the splitter 418. The interferometric detector 420 is configured to output an electrical signal indicative of a value of an amplitude quadrature or a phase quadrature of the modulated data signal. In an example, the interferometric detector 420 is a homodyne detector, and the relative phase difference between the modulated data signal and the local oscillator signal that is imposed by the phase modulator 416 determines which of the amplitude quadrature and the phase quadrature that the electrical signal output by the homodyne detector refers to. In another example, the interferometric detector 420 is a heterodyne detector that measures both the phase quadrature and the amplitude quadrature. The system 112 further comprises a signal analysis system 422 that receives the electrical signal indicative of the value of the amplitude and phase and decodes data encoded on the amplitude and phase values of the modulated data signal. As described above with respect to the signal analysis system 220 of the DV-QKD system of FIG. 2, in an example the signal analysis system 422 can be an FPGA, ASIC, real-time processor, etc., that can process and decode encoded data. Further, the signal analysis system 422, while depicted in the exemplary system 400 as a component of the optical receiver system 112, can be a component of the electrical control system 114 of the receiver 104.

Figure 5:
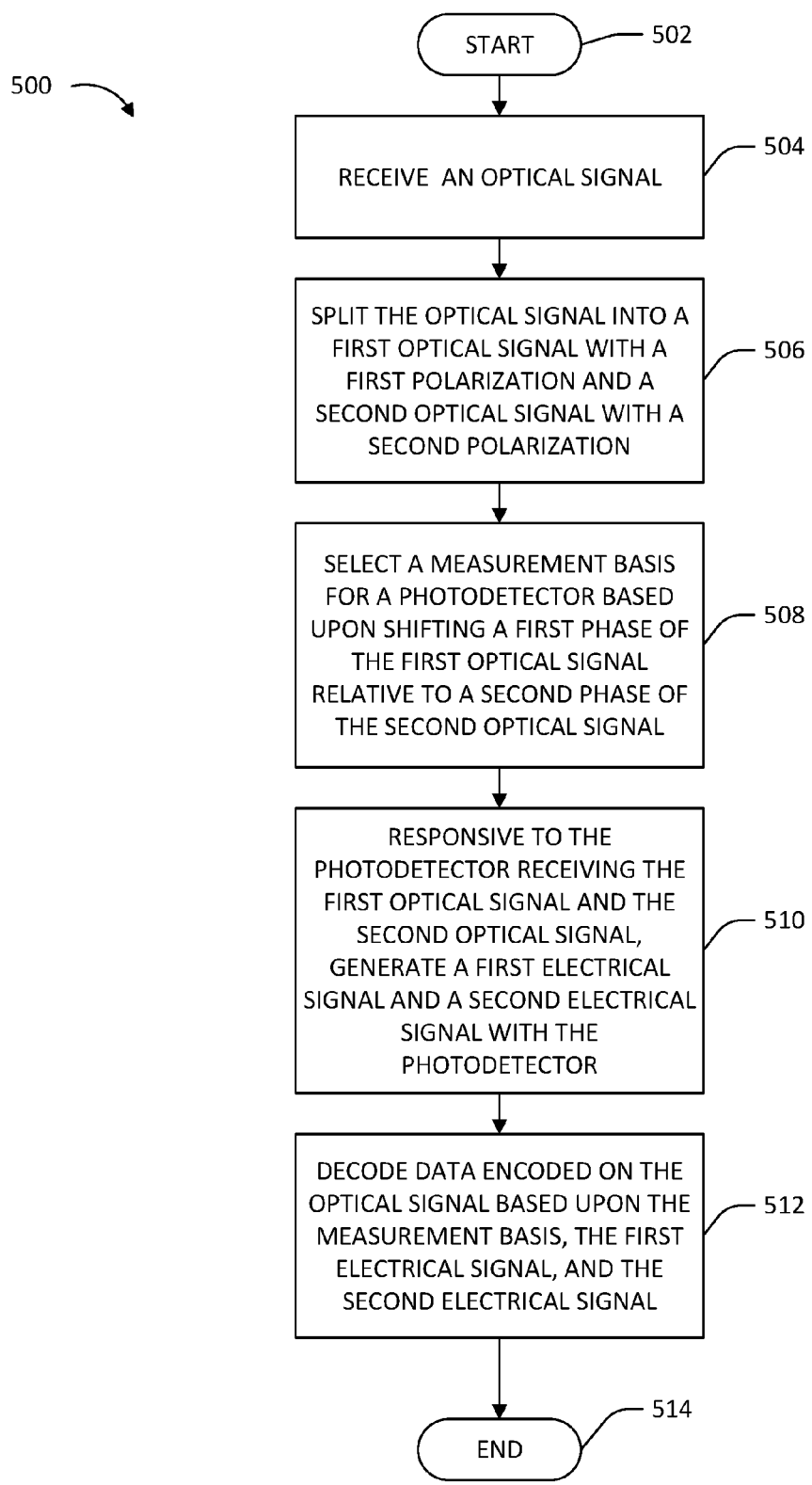
FIG. 5 is a flow diagram that illustrates an exemplary methodology for performing DV-QKD.
Figure 6:
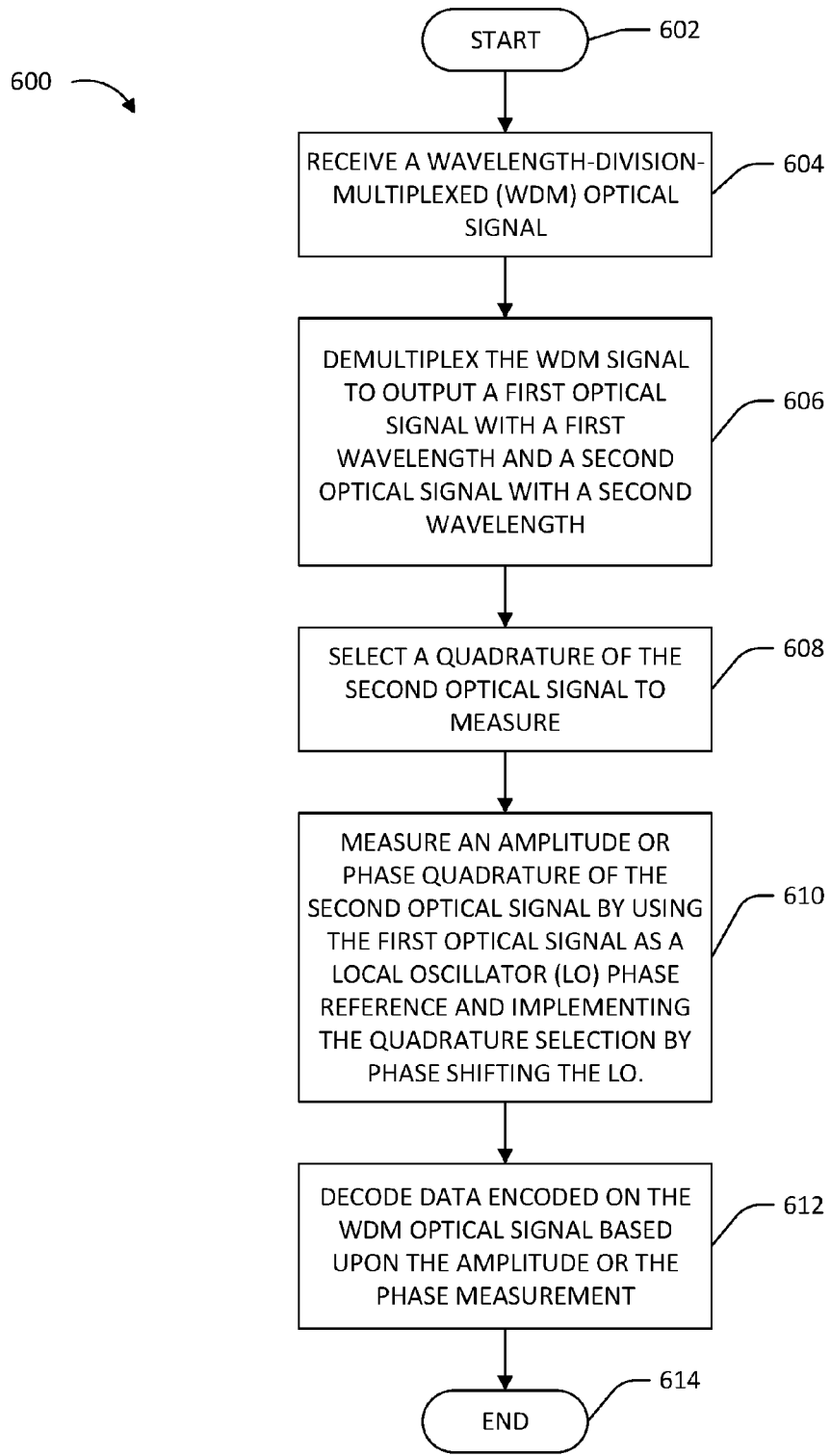
FIG. 6 is a flow diagram that illustrates an exemplary methodology for performing CV-QKD.

FIGS. 5-6 illustrate exemplary methodologies relating to performing QKD with integrated optics components. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, a methodology 500 that facilitates DV-QKD is illustrated. The methodology 500 begins at 502, and at 504 an optical signal, encoded with some data on a polarization of the optical signal, is received. In an example, the optical signal is received over a fiber transmission line from an integrated electro-optical circuit functioning as a transmitter. At 506, the optical signal is split into a first optical signal and a second optical signal. In an example, a polarization beam splitter is used to split the optical signal into the first optical signal and the second optical signal. At 508, a measurement basis for a photodetector is selected based upon shifting a first phase of the first optical signal relative to a second phase of the second optical signal. In another example, the measurement basis is selected by a Mach-Zehnder modulator that is configured to receive the first and second optical signals and to impart a relative phase shift between them. At 510 the photodetector, responsive to receiving the first and second optical signals, generates a first electrical signal and a second electrical signal. At 512, data encoded on the optical signal is decoded based upon the measurement basis selected at 508, the first electrical signal, and the second electrical signal. In yet another example, the data is decoded by a signal analysis system comprising an FPGA or an ASIC configured to analyze the electrical signals based upon the chosen measurement basis. At 514, the methodology 500 ends.

Referring now to FIG. 6, a methodology 600 that facilitates CV-QKD is illustrated. The methodology 600 begins at 602, and at 604 a WDM optical signal is received. At 606, the WDM optical signal is demultiplexed to output a first optical signal with a first wavelength and a second optical signal with a second wavelength. In an example, at 608, a quadrature of the second optical signal is chosen to be measured. The selected quadrature (amplitude or phase) of the second optical signal is measured at 610 by shifting the phase of the first optical signal and performing a homodyne measurement using this first optical signal as a local oscillator. In another example, both quadratures of the second optical signal are measured by heterodyne interferometric detection that uses the first optical signal as the local oscillator. At 612, data encoded on the WDM optical signal is decoded based upon the measured amplitude and/or phase, whereupon the methodology 600 ends at 614.

Figure 7:
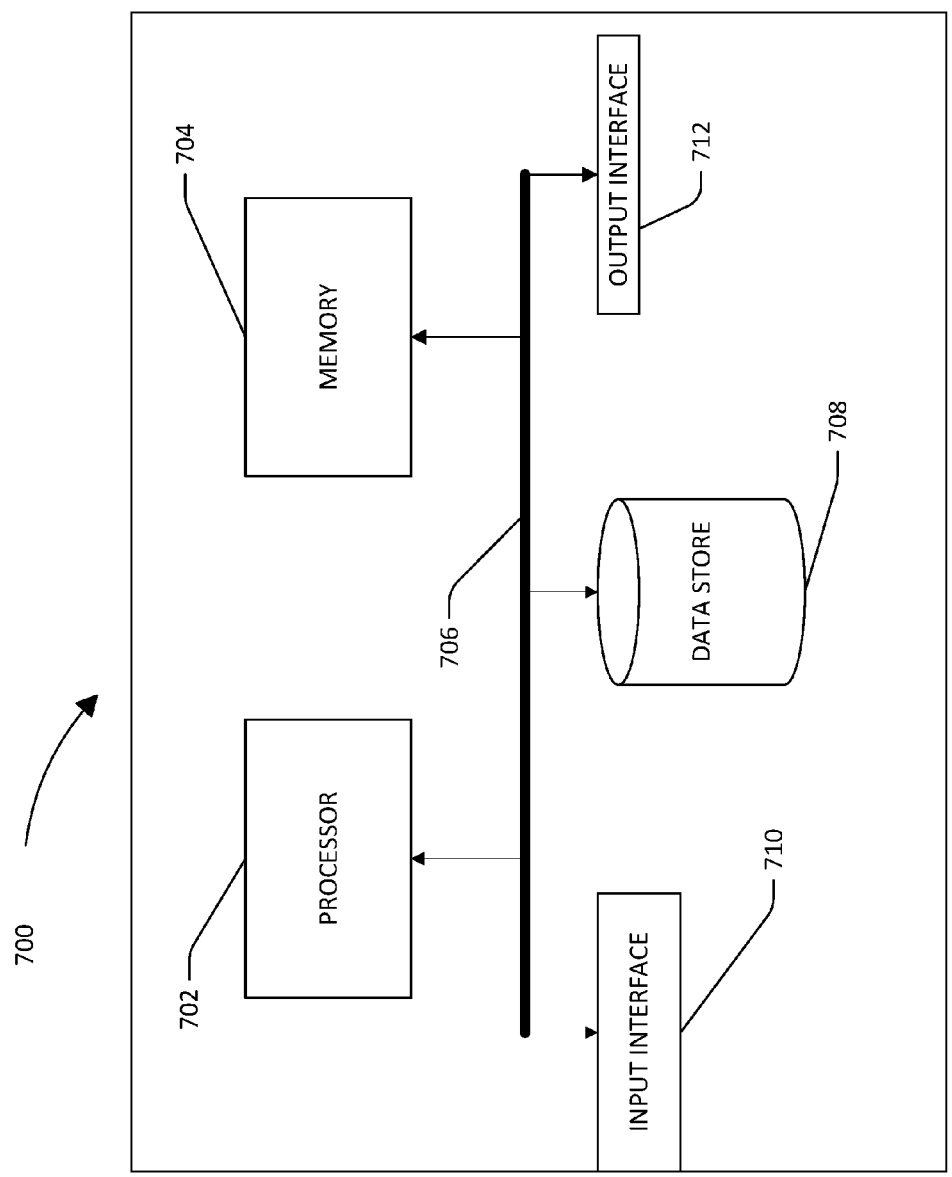
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a system that prepares or stores data for reception or transmission via the QKD systems and methods described herein. By way of another example, the computing device 700 can be used in a system that allows a user to prepare and select data to be transmitted via a QKD communications system. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store data received from a QKD system.

The computing device 700 additionally includes a data store 708 that is accessible by the processor 702 by way of the system bus 706. The data store 708 may include executable instructions, received QKD data, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An optical communications system that is configured for quantum communications comprising:
   a transmitter, wherein the transmitter is a first integrated electro-optical circuit comprising the following components on a first semiconductor substrate:
   a laser that generates a local oscillator optical signal;
   an optical splitter that splits the local oscillator optical signal into a first local oscillator component signal and a second local oscillator component signal;
   a modulator that modulates at least one of a first phase or a first amplitude of the second local oscillator component signal to encode first data;

a frequency shifter that changes a wavelength of the first local oscillator component signal or the second local oscillator component signal; and a first wavelength division multiplexer that multiplexes the first local oscillator component signal and the second local oscillator component signal and outputs an optical signal; and a receiver, wherein the receiver is a second integrated electro-optical circuit comprising the following components on a second semiconductor substrate:

a second wavelength division demultiplexer that receives the optical signal and outputs a first optical signal and a second optical signal, wherein the first optical signal and the second optical signal are based upon the optical signal received by the second wavelength division demultiplexer;

an interferometric detector that, responsive to receiving the first optical signal and the second optical signal, outputs an electrical signal that is indicative of a value of at least one of an amplitude quadrature or a phase quadrature of the second optical signal; and a signal analysis system that decodes first data encoded on the optical signal based upon the electrical signal.

2. The system of claim 1, wherein the first optical signal and the second optical signal have different wavelengths.

3. The system of claim 2, the interferometric detector is a heterodyne detector.

4. The system of claim 1, wherein the interferometric detector is a homodyne detector, the system further comprising:

a phase modulator that selects one of the phase quadrature or the amplitude quadrature of the second optical signal, the electrical signal being indicative of the value of the selected quadrature, the selection being made by shifting a phase of at least one of the first optical signal or the second optical signal such that the first optical signal has a first phase and the second optical signal has a second phase, the first phase being offset from the second phase.

5. The system of claim 1, wherein the transmitter and the receiver communicate to perform continuous-variable quantum key distribution.

6. A method that facilitates continuous-variable quantum key distribution, comprising:

at a transmitter:
generating a local oscillator optical signal;
splitting the local oscillator optical signal into a first local oscillator component signal and a second local oscillator component signal;
modulating at least one of a first phase or a first amplitude of the second local oscillator component signal to encode first data on the second local oscillator component signal;
shifting a frequency of at least one of the first local oscillator component signal or the second local oscillator component signal; and
performing wavelength-division-multiplexing (WDM) on the first local oscillator component signal and the second local oscillator component signal to generate a WDM optical signal; and at a receiver:
responsive to receiving the WDM optical signal, demultiplexing the WDM optical signal to output a first optical signal and a second optical signal;
measuring at least one of a second amplitude or a second phase of the first optical signal based upon the first optical signal and the second optical signal; and
decoding second data encoded on the WDM optical signal based upon the at least one of the second amplitude or the second phase, wherein the second data is the first data.

7. The method of claim 6, wherein measuring the at least one of the second amplitude or the second phase of the first optical signal comprises performing homodyne detection between the first optical signal and the second optical signal.

8. The method of claim 6, wherein measuring the at least one of the second amplitude or the second phase of the first optical signal comprises performing heterodyne detection between the first optical signal and the second optical signal.

9. An optical communications system configured to perform continuous-variable quantum key distribution (CV-QKD), comprising:

a transmitter configured to perform first acts comprising:
generating an optical signal;
splitting the optical signal into a first optical component signal and a second optical component signal;
modulating at least one of a first phase or a first amplitude of the second optical component signal to encode first data on the second optical component signal;
shifting a frequency of at least one of the first optical component signal or the second optical component signal; and
performing wavelength-division-multiplexing (WDM) on the first optical component signal and the second optical component signal to generate a combined optical output signal; and a receiver configured to perform second acts comprising:
responsive to receiving the combined optical output signal, demultiplexing the combined optical output signal to output a third optical component signal and a fourth optical component signal;
measuring at least one of a second amplitude or a second phase of the third optical component signal based upon the third optical component signal and the fourth optical component signal; and
decoding second data encoded on the combined optical output signal based upon the at least one of the second amplitude or the second phase, wherein the second data is the first data.

10. The optical communications system of claim 9, wherein measuring the at least one of the second amplitude or the second phase of the third optical component signal comprises performing heterodyne detection between the third optical component signal and the fourth optical component signal.

11. The optical communications system of claim 10, wherein measuring the at least one of the second amplitude or the second phase of the third optical component signal further comprises shifting the second phase of the third optical component signal or a third phase of the fourth optical component signal prior to performing the heterodyne detection.

12. The optical communications system of claim 11, the shifting configured to select which of the one of the second phase or the second amplitude of the third optical component signal to measure by way of the heterodyne detection.

13. The optical communications system of claim 9, wherein the third optical component signal comprises the second optical component signal and the fourth optical component signal comprises the first optical component signal.

14. The optical communications system of claim 9, wherein the transmitter comprises a laser configured to generate the optical signal.

15. The optical communications system of claim 9, wherein the transmitter is implemented on a single semiconductor substrate.

16. The optical communications system of claim 9, wherein the receiver implemented on a single semiconductor substrate.

* * * * *